UNITED STATES PATENT OFFICE.

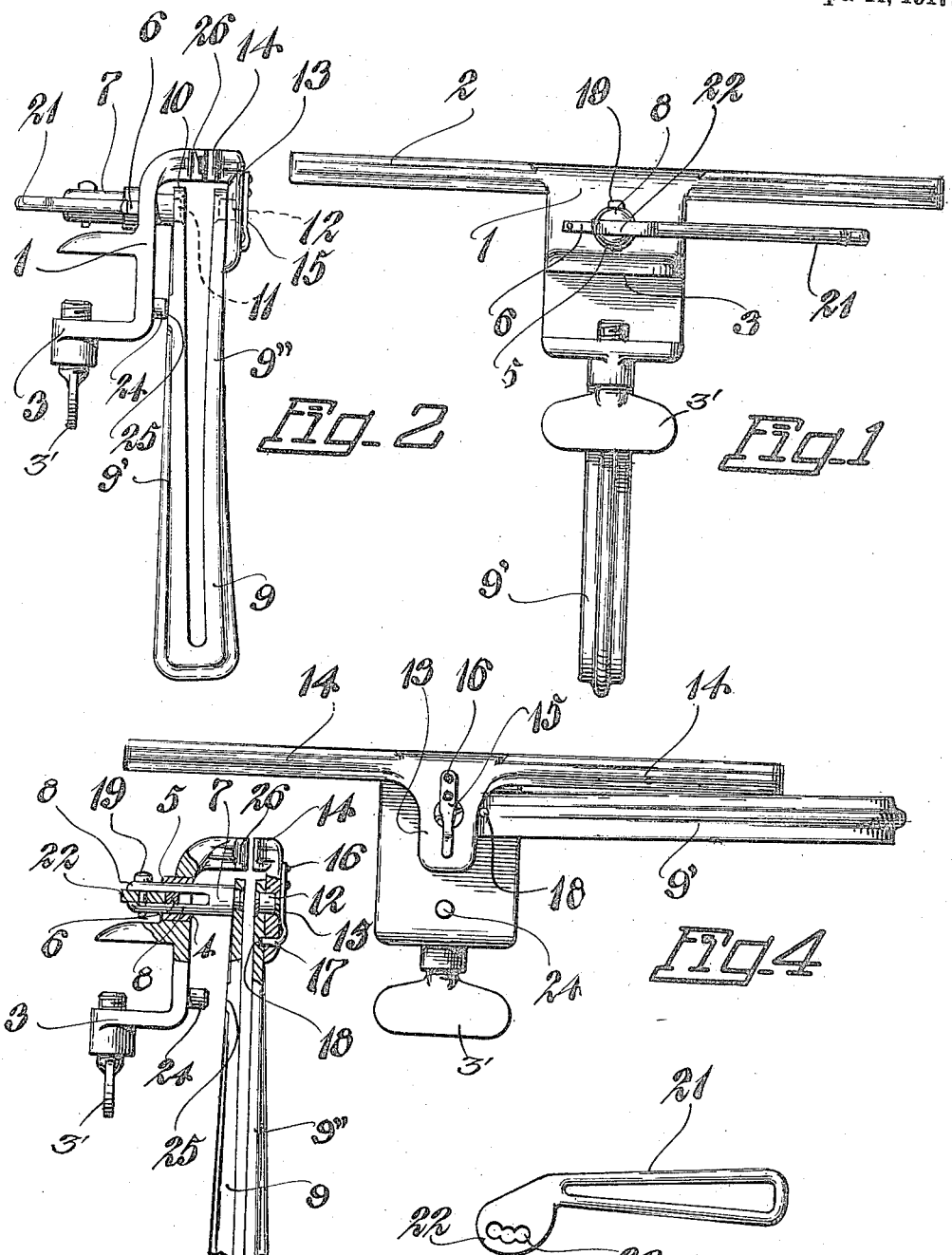

WALTER McDANIEL, OF SPOKANE, WASHINGTON.

SAW-CLAMP.

1,239,709.     Specification of Letters Patent.     Patented Sept. 11, 1917.

Application filed April 23, 1917. Serial No. 163,909.

*To all whom it may concern:*

Be it known that I, WALTER McDANIEL, a citizen of the United States, residing at Spokane, in the county of Spokane and State of Washington, have invented certain new and useful Improvements in Saw-Clamps, of which the following is a specification.

My invention relates to improvements in saw clamps, and the primary object is the provision of a novel device of this character of efficient, comparatively simple, and inexpensive construction.

A further most important object is the provision of a saw clamp which will accommodate saws of extreme width of blade.

A further object resides in providing a clamp which may be folded into a comparatively small compass convenient for storing or shipping.

Generally speaking, the invention comprises a saw clamping unit which includes a saw clamping jaw and means formed integral therewith for securing the unit to a work bench or other rigid support, a slotted pin slidably mounted in an annular opening through the clamping unit, a bifurcated or slotted and substantially U-shaped, spring-tensioned, saw receiving arm, said arm having one free end thereof pivotally supported by said slotted pin, a saw clamping jaw pivotally mounted upon the remaining end of said arm, and a cam-lever carried by said slotted pin and adapted to effect clamping action of the jaws.

The invention further resides in the combination, arrangement, and details of the several elements, hereinafter more fully pointed out, described, and claimed, recourse being had to the accompanying drawings, in which—

Figure 1 is a view of the device in elevation showing particularly the bench-clamp, stationary saw clamping unit and jaw, and the cam-lever.

Fig. 2 is an endwise view, the elements being in their respective, relative positions such as they assume when the clamping jaws are in saw engaging relation.

Fig. 3 is a view similar to Fig. 2 with the working elements shown partly in section to better disclose the construction, and the clamping jaws being in open position.

Fig. 4 is a view in elevation taken on the opposite side of the device to that of Fig. 1, and illustrating the slotted saw receiving arm element in a differently adjusted position.

Fig. 5 is a detail view of the cam-lever.

Referring more particularly to the drawings, in which like characters of reference are used to indicate like parts in the several views, the numeral 1 designates a saw clamping unit which is preferably formed in one piece and has formed integral therewith a saw gripping jaw 2, and a bench clamp 3. The saw clamping unit is bored through as at 4 and the bore provided with an annular bushing 5 which has a dividing bridge-piece 6 which separates and bisects the bushing opening. A longitudinally slotted pin 7 is slidably mounted in said bushing, its bifurcated portions 8 embracing said bridge-piece upon opposite faces.

A bifurcated, substantially U-shaped, spring tensioned saw receiving arm 9, formed with legs 9' and 9", has one bored extremity 10 pivotally mounted upon a reduced end 11 of said pin 7. The opposite bored end of the arm supports pivotally by means of a short screw 12, a clamping unit 13 having the long saw gripping jaw 14 which is opposed to and coöperates with jaw 2 for clamping a saw.

A spring clip 15 has one end secured by screws or the like 16 to the clamping unit 13, its opposite end portion 17 being turned and inserted in an aperture through said unit 13, the extremity of the turned end being adapted to engage a registering recess 18 in the opposed face of the leg 9".

Mounted in the slot of the pin 6 by means of a cotter pin or the like 19 is a cam-lever 21 having a cam 22 provided with a plurality of communicating, adjacent apertures 23. Said cam is adapted to engage the bridge-piece 6 to exert pressure thereagainst, such pressure acting to slidably retract the pin 7 in bushing 5 and thereby operating to draw the jaw 14 in the direction of the jaw 2. As is evident, the degree of cam action may be increased or diminished in scope, so as to accommodate saw blades of various thicknesses, by employing selectively the apertures 23 to form the pivot for the cam-lever.

A stud 24 is adapted to engage the opposed face of the leg 9' at 25 to prevent pivotal movement of the slotted saw receiving arm 9 when the latter is adjusted in depending relation to its supporting elements. Occasionally a saw blade is of too great width to be received into the slot of the arm 9 and in such relation that its toothed edge will protrude the desired degree above the gripping jaws. In such an emergency the arm 9 is swung on its pivots into a position substantially parallel with the jaws, as illustrated in Fig. 4, when the saw blade may be properly inserted between the jaws and clamped in place without interference of the slotted arm. The inner faces of the jaws are preferably provided with fiber or rubber inserts 26. The bench clamp 3 is of the usual pattern having a thumb screw 3'.

Having described my invention, its construction and advantages, I claim as new and desire to secure by Letters Patent of the United States:—

1. In a device of the character described, a saw clamping unit having a bore therethrough, a saw clamping jaw supported by said unit, a pin slidably mounted in said bore, a bifurcated saw receiving arm having one end mounted upon said pin, an additional saw clamping jaw mounted upon the opposite end of said arm, and means for exerting pressure on said pin.

2. In a device of the character described, a saw clamping unit having a bore therethrough, a saw clamping jaw supported by said unit, a bushing for said bore, a dividing bridge-piece in said bushing, a slotted pin mounted in said bushing and embracing said bridge-piece, a cam-lever pivotally mounted in the slot of said pin and bearing against said bridge-piece, a bifurcated saw receiving arm having one end mounted on said pin, and an additional saw clamping jaw mounted on the opposite end of said arm.

3. In a device of the character described, a saw clamping unit having a bore therethrough, a saw clamping jaw supported by said unit, a pin slidably mounted in said bore, a bifurcated saw receiving arm formed of tensionable legs and having one end mounted upon said pin, an additional saw clamping jaw mounted upon the opposite end of said arm, and means for exerting and maintaining pressure on said pin.

4. In a device of the character described, a saw clamping unit having a bore therethrough, a saw clamping jaw supported by said unit, a pin slidably mounted in said bore, a cam-lever carried by said pin for exerting and maintaining pressure on said pin, a bifurcated saw receiving arm having one end pivotally mounted on said pin, an additional saw clamping unit pivotally mounted upon the opposite end of said arm, and a saw clamping jaw for said latter unit.

5. In a device of the character described, a saw clamping unit having a bore therethrough, a saw clamping jaw supported by said unit, a pin slidably mounted in said bore, a cam-lever carried by said pin for exerting and maintaining pressure on said pin, a bifurcated saw receiving arm having one end pivotally mounted on said pin, an additional saw clamping unit pivotally mounted on the opposite end of said arm, a saw clamping jaw supported by the latter unit, and a spring clip carried by said latter unit and adapted to interlock said unit and arm.

In testimony whereof I affix my signature.

WALTER McDANIEL.

Copies of this patent may be obtained for five cents each, by addressing the "Commissioner of Patents, Washington, D. C."